J. GALLEAZZI.
EDUCATIONAL AND AMUSEMENT DEVICE.
APPLICATION FILED MAY 9, 1921.

1,424,467.

Patented Aug. 1, 1922.
3 SHEETS—SHEET 1.

INVENTOR
J. GALLEAZZI
BY
ATT'YS.

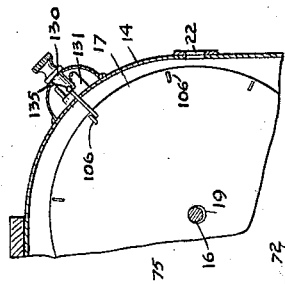
J. GALLEAZZI.
EDUCATIONAL AND AMUSEMENT DEVICE.
APPLICATION FILED MAY 9, 1921.
1,424,467.
Patented Aug. 1, 1922.
3 SHEETS—SHEET 2.
INVENTOR
J. GALLEAZZI
ATT'YS.

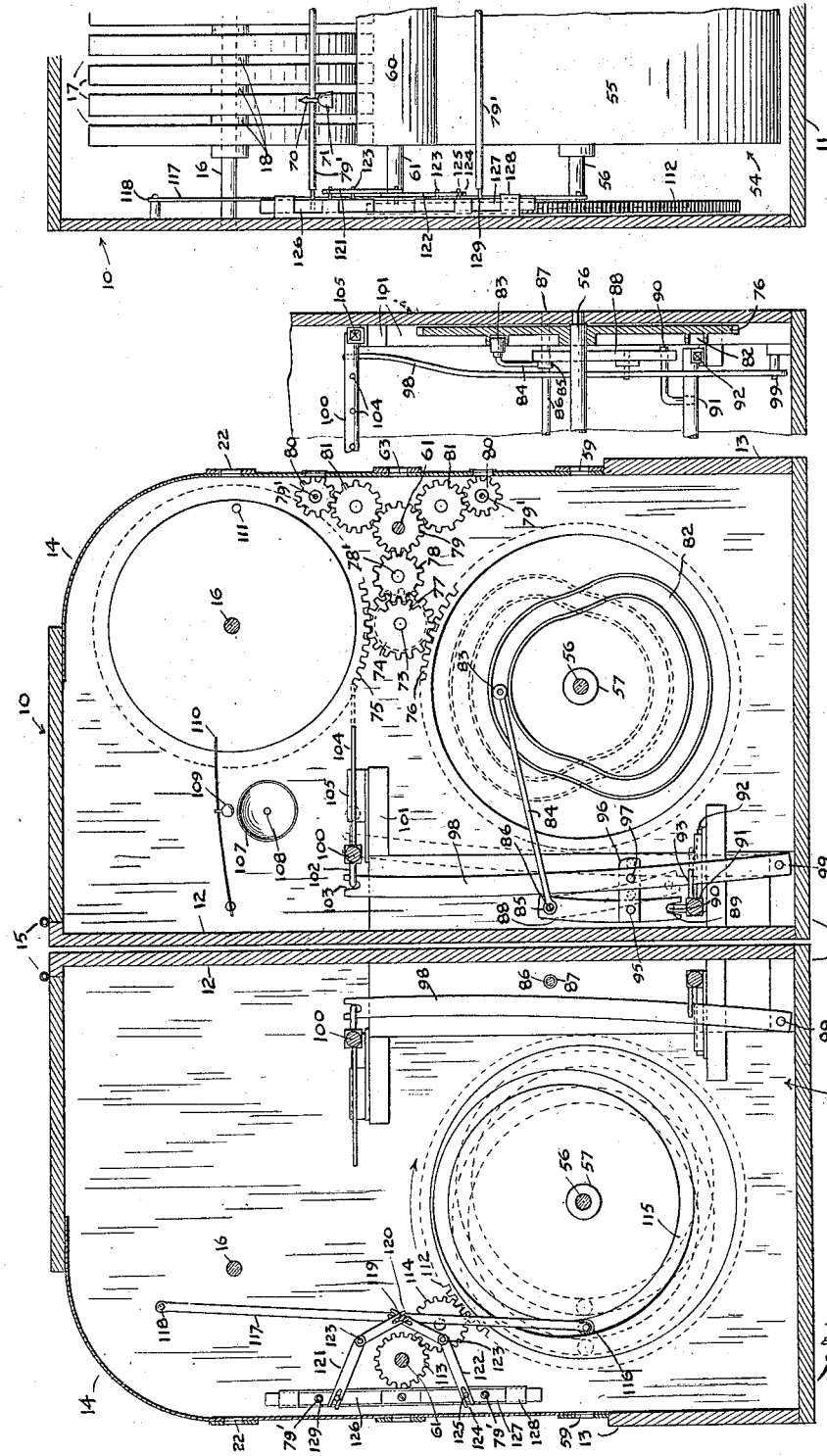

UNITED STATES PATENT OFFICE.

JOSEPH GALLEAZZI, OF SAN FRANCISCO, CALIFORNIA.

EDUCATIONAL AND AMUSEMENT DEVICE.

1,424,467. Specification of Letters Patent. Patented Aug. 1, 1922.

Application filed May 9, 1921. Serial No. 468,154.

*To all whom it may concern:*

Be it known that I, JOSEPH GALLEAZZI, a citizen of the United States, residing at San Francisco, in the county of San Francisco and State of California, have invented new and useful Improvements in Educational and Amusement Devices, of which the following is a specification.

This invention relates to improvements in educational and amusement devices of the type embodied in my U. S. Letters Patent No. 1,386,248, issued August 2, 1921.

The primary object of the invention is to provide an educational and amusement device by means of which a great many different subjects of instruction or teaching may be effectively and impressively brought to the attention of the persons receiving the instruction. This is accomplished through the instrumentality of mechanically operated means which may be put into operation by turning a small crank handle at the side of the machine or may be power operated, the mechanism of the machine operating so that different indicia relating to the several subjects will be presented to view each time the machine is operated, it being impossible to determine in advance, what particular indicia will be presented to view.

Another object is to provide a machine or device of the character described with which arithmetic, history, geography, reading and spelling may be taught, the machine operating in such manner as to hold the interest of the pupils and prove amusing with the result that the instruction will be more impressive.

A further object is to provide a machine or device of the character described with which a thorough course of instruction, in a plurality of subjects may be easily given, the machine being comparatively small, compact and relatively inexpensive, commensurate with effectiveness and utility.

A further object is to provide novel means for regulating the display of indicia relating to certain subjects.

This invention possesses other advantages and features some of which, with the foregoing will be set forth at length in the following description where I shall outline in full that form of the invention which I have selected for illustration in the drawings accompanying and forming a part of the present specification. In said drawings I have shown one form of the construction of my invention, but it is to be understood that I do not limit myself to such form since the invention as expressed in the claims may be embodied in a plurality of forms.

Referring to the drawings:

Figure 2 is a front elevation, broken away in part, to show the interior arrangement and construction.

Figure 3 is a fragmentary side elevation of a part of the device showing one of the discs and selective stop means as the latter would appear when holding the disc against movement.

Figure 4 is fragmentary side elevation of the part shown in Fig. 3 but showing the stop means as when free from engagement with the disc.

Figure 5 is a fragmentary side elevation of a disc showing a part of the automatic stop mechanism in position to stop the disc.

Figure 6 is a vertical sectional view taken through the machine looking towards one end thereof.

Figure 7 is a vertical sectional view taken through the machine looking towards the other end thereof.

Figure 8 is a fragmentary vertical sectional view taken at right angles to Figs. 6 and 7 and showing in particular the automatic disc stopping means, in front elevation.

Figure 9 is a fragmentary front elevation of the device with the cover and front wall removed and showing the walls of the casing in section and the mechanism in elevation.

Figure 1:
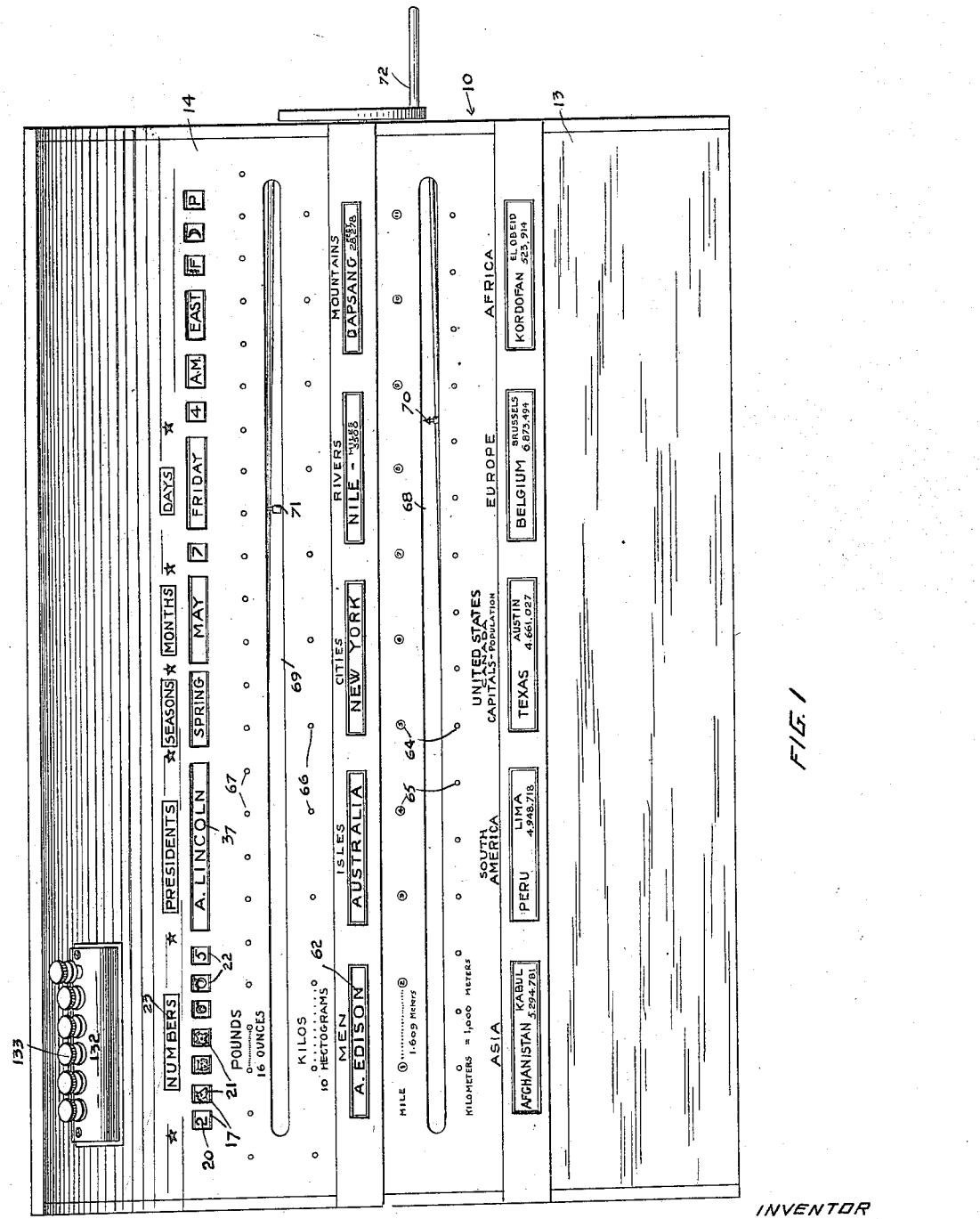
Figure 1 is a front elevation of the invention.

In carrying out the invention I employ a suitable casing or housing, capable of being mounted upon a stand or table, and I mount within the housing mechanism for presenting to view through openings in one wall of the housing, a variety of indicia relating to various subjects of instruction, such as history, arithmetic, and geography, the mechanism being operable by the turning of the crank handle on the outside of the housing and may be power operated, if desired.

Referring particularly to the embodiment of the invention illustrated in the accompanying drawings, there is provided a casing or housing 10, which is made up of a bottom wall 11, rear wall 12, end walls 12′, and a comparatively low front wall 13. A combined cover and front wall 14 is hinged as at 15 at the upper end of the rear wall and rests upon the upper edge of the front wall 13, said cover being provided with a series of slots or openings such as will be later more fully described, for the purpose of permitting the indicia on the displaying mechanism to be viewed.

The displaying means for presenting the indicia of the different subjects of instruction are in the form of discs, drums and rollers, the discs and drums being loosely mounted upon revolvable shafts in such manner that, when the shafts are rotated said discs and drums will, by frictional engagement with said shafts, be correspondingly rotated, but when held, will permit said shafts to rotate independent thereof. Extending transversely across the upper side of the housing or casing is a revolvable shaft 16, having loosely mounted thereon adjacent to one another, a plurality of comparatively thin circular discs 17. Between the discs are washers 18, which provide for spacing of the discs relative to one another. The openings 19 through the center of the discs, which openings receive the shaft 16, are of such size that when the shaft is rotated the discs will be correspondingly moved, but so that certain of the discs will have a greater degree of movement or rotation than the others. This relative degree of rotation being provided for, not only by the loose frictional engagement with the shaft, but through the instrumentality of the washers 18, opposite faces of which engage the opposed faces of the discs. Each of the discs is provided upon its periphery and transversely, with indicia in the form of numbers designated 20, said numbers being spaced apart a predetermined distance. Between the numbers are painted, printed or otherwise caused to appear, on the discs, a plurality of characters 21, such as pictures of animals or fruit. There are preferably provided several discs, so that figures from zero to a million in various combinations and units may be presented to view as desired. The discs are mounted adjacent to one end of the housing and close to the front wall or cover 14. Formed through said front wall 14 are a plurality of small square openings 22 in a horizontal row, each opening being spaced from the other and arranged to be opposite the periphery of one of the discs. Above the row of openings, the designation "Numbers" may be printed, as shown at 23.

Loosely mounted upon the shaft 16 are the circular drums 24, 25 and 26 having the same diameter as the discs 17. Washers 27 loosely surround the shaft 16 and space the drum 24 from the adjacent disc 17 and from the drum 25. The disc 28, corresponds in size to the disc 17 and is loosely mounted upon the shaft 16 between the drums 25 and 26, said disc being spaced from the said drums by loose washers 29. The remaining portion of the shaft 16 has a plurality of discs 30, 31, 32, 33, 34, and 35, loosely mounted thereon, said discs being of various thickness, depending upon the indicia to be placed or carried thereon and being spaced from one another by loose washers 36. All of the discs and drums are of the same diameter so as to bear the same relation at their peripheries to the front wall 14. The drum 24 will have printed thereon, the names of famous persons, for instance, the Presidents of the United States, as shown at 37. A slot 38 is provided in the front wall 14 and is substantially equal in length to the thickness of the drum so that the indicia 37 of the drum, when brought opposite said wall, will be visible. The drum 25 may contain two sets of indicia representing different subjects, for example, the seasons and months of the year. Designations 39 and 40, represent these subjects and extend transversely on the drum. The front wall is provided with slots 41 and 42 to provide for the displaying of the designations 39 and 40. The disc 28 may contain the designations 43, indicating the days of the month and a small longitudinal opening 44 is provided in the front wall to permit of the displaying of such designations. The drum 26 may have designations 45 thereon, representing the days of the week, and the opening 46 is provided in the front wall opposite this drum. The discs 30, 31, 32, 33, 34 and 35 may respectively bear designations 47, 48, 49, 50, 51 and 52, representing the hours of the day, the time, (A. M.—P. M.) the cardinal and inter-cardinal points of the compass, the notes of music, the different phases of the moon and the letters of the alphabet. The front wall 14 is provided with a series of spaced openings 53 arranged opposite the discs 30 to 35 inclusive. The openings and slots in the front wall 14 are in the same horizontal plane so that the indicia will be presented in a row extending entirely across the front of the housing and may be read from left to right or otherwise, as desired. It will be seen that any number of discs and drums may be employed for presenting or displaying indicia relating to different subjects, and I wish it understood that I do not limit myself to the number of discs and drums herein shown or to the number of subjects of instruction.

The mechanism hereinabove described takes up the entire upper part of the casings or housings from end to end thereof and similar mechanism designated 54 is likewise extended across the lower side of the housing. The mechanism 54 comprises a plurality of drums 55 of circular form, loosely mounted upon a horizontal shaft 56, which latter is rotatably mounted in suitable bearings 57 on the end walls of the housing. The drums 55 are spaced slightly from the discs and drums and above them have designations or indicia 58 transversely on the peripheries thereof, said indicia representing the countries of the different continents such as Europe, Asia, Africa and the American Continent, which is preferably divided so that one drum refers to South America and the other to North America, the United States and Canada. Any designations relative to the subject of geography may be borne on these drums as desired. A plurality of slots 59 are formed through the front wall 14, opposite the drums 55, whereby the indicia thereon may be readily presented to view.

Mounted forwardly of and between the upper and lower mechanism is a circular roller 60 having its trunnions 61 journalled in the end walls of the casing or housing. This roller is equal in length to the rows of drums and discs and will have on the periphery thereof spaced rows of indicia 62 representing the names of famous men, islands etc. A plurality of slots 63 are formed in the front wall so as to provide for the presentation of these names. On the front wall extending transversely across the outer face thereof, there may be provided other designations or indicia representing linear and metric systems, and weights and measures, as shown by the designations of characters 64, 65, 66 and 67. Any other table or scale of measurements or like data may be printed or otherwise caused to appear on the front of the housing or casing. Between these characters or indicia 64, 65, 66 and 67, which characters are spaced in horizontal rows, are provided longitudinal slots 68 and 69. Mounted within the housing is suitable mechanism to provide for the movement of pointing or designating members 70 and 71 along the slot, during the operation of the machine, the said pointers or designating members when opposite the designations 64, 65, 66 and 67 indicate that such designations are to be read by the pupils.

The means for operating the shafts 16 and 50 also the roller 60 comprises a crank handle 72 upon a shaft 73, which shaft is journalled in one end of the wall of the housing and projects outwardly therefrom to provide for the attachment of the crank handle. A pinion 74 is fixed to this shaft and meshes with a large gear 75 fixed to the shaft 16 and also meshes with a large gear 76 fixed to the shaft 56. This provides for the rotation of the shafts 16 and 56 and the various discs and drums mounted thereon. The shaft 73 also carries a pinion 77 which meshes with an idler gear 78 mounted on the shaft 78' supported by the end wall. The idler gear 78 meshes with a pinion 79 fixed to the adjacent trunnion 61 of the roller 60 and in this way rotation of the roller is provided for. The pointer members 71 and 72 are mounted upon rods 79' rotatably supported by the end walls of the casing. Certain ends of these rods are lifted up and down during the operation of the machine, by mechanism which will be later more fully described, whereby the pointer members will gravitate on said rods. To prevent the sticking of these members and insure the movement of said pointer members, the rods are rotated. Small gears 80 are fixed to certain ends of the rods and mesh with idler gears 81 supported by the adjacent end wall, and the idler gear meshes with the pinion 78.

To provide for automatically stopping the discs and drums so as to bring the designations thereon opposite the openings and slots in the front wall or cover, suitable mechanism for engaging portions of said drums and discs is provided and is arranged to be operated from the gear 76. This mechanism comprises an eccentric track member 82 mounted upon one side of the gear 76. A shoe 83 is arranged to engage in said track member 82 and is supported upon one end of a rod 84, which rod is fixed, as at 85, at its other end to a rotatable horizontal shaft 86 extending transversely across the casing adjacent to the back wall thereof. The shaft 86 is suitably rotatably supported as at 87, in the end walls of the casing. Depending from the shaft 86 is a curved arm 88, the upper end of which is fixed to said shaft. The lower end of the arm is recessed as at 89 and receives an upstanding lug 90, carried upon a bar 91, which bar is slidable forwardly and rearwardly upon suitable supporting means 92. The bar 91 extends horizontally and rearwardly of the set of drums 55 adjacent the lower sides of said drums. A plurality of stop pins 93 are carried by the bar 91 and project horizontally and forwardly therefrom. The drums 55 are provided on the side faces thereof adjacent their peripheries with lugs 94, with which the pins 93 engage when said pins are moved forwardly. When this takes place the drums 55 are held against rotation and the shaft 56 rotates freely, relative to said drums. The eccentric track 82, lugs 94 also the elements 84, 88, 91 and 93 are so arranged that when the crank handle 72 is rotated the drums 55 will be rotated several times before the stop pins 93 move into position to engage the lugs 94 and furthermore, so that when this engagement of the stop pins and lugs takes place, the indicia on the periphery of the drums will be presented opposite the slots or openings 59.

Fixed as at 95 to the arm 88, at a point intermediate of the ends of said arm and projecting outwardly at right angles thereto, is a link 96 pivoted at 97 to an upright arm 98. The lower end of the arm 98 is pivoted as at 99 to the lower wall of the housing. The arm 98 extends upwardly to a point adjacent but spaced rearwardly from the discs 17. A horizontal bar or rod 100 is slidable forwardly and rearwardly upon a support 101 therefor, which support is secured to the bottom and rear walls of the housing. Extending rearwardly from the bar 100 is an eye or staple 102 which engages in a bifurcation 103, formed in the upper end of the arm 98. Thus when the arm 98 is rocked on its pivot 99 the bar 100 is moved backward and forward on the support 101. A plurality of stop pins 104 are secured to the bar 100 and project forwardly and horizontally therefrom. These pins are adapted to engage between the discs and between the drums on the shaft 16. The discs and drums on the shaft 16 are provided upon their side faces and adjacent their peripheries, with lugs 106 spaced apart so that they may encounter the pins 104. When the pins 104 engage the lugs 106 the discs and drums are brought to rest with the designations opposite the openings and slots in the front wall.

There is provided signaling means for indicating to the operator when the operation of the crank handle must be stopped, which means is preferably in the form of a bell that is caused to ring at such time when the drums and discs have the indicia thereon alined so as to be presented at the openings and slots in the front wall of the housing. This bell 107 is mounted upon one end wall of the housing and operated by a striker 109, one end of which is disposed to be engaged by the lug 110 provided on the gear 75. The lug will engage the striker once during each rotation of the gear and during each rotation of the gear the drums and discs will rotate several times.

To provide for the vertical movement of the rods 79', at one end of each of the rods so as to cause said rods to be inclined and the pointer members to slide, there is provided a gear 112 which is fixed to the shaft 56 and operatively associates with a gear 113 mounted on the adjacent trunnion 61 of the roller 60, there being an idler gear 114 intermeshing with the gears 112 and 113. The gear 112 has an eccentric track member 115 thereon, in which travels a shoe 116. Pivoted to the shoe at one end, is a rod 117, the upper end of which is pivoted as at 118, to the adjacent end wall of the casing. Fixed to the rod 117 is a pin 119 on which the bifurcated ends 120 of angular rocker arms 121 and 122 are mounted. The rocker arms are pivoted intermediate their ends as at 123 to the adjacent end wall. The other ends of the rocker arms are slotted or bifurcated as at 124, and receive pins 125 of two slide members 126 and 127, both of which slide members are movable in a vertical guide 128, fixed to the adjacent end wall. The adjacent ends of the rods 79' are pivotally and rotatably connected with said slide members as at 129. As the gear 112 rotates, the eccentric 115 oscillates the arm 117, whereby the rockers 121 and 122 are moved so that the slides members 126 and 127 move in opposite directions and cause the rods 79' to be inclined in opposite directions, whereby the pointer members 70 and 71 will slide along said rods.

In order to provide for the presentation of numbers on the disc 17 in units of tens, hundreds and so on up to the millon mark, at the will of the operator, there is provided stop means in connection with each disc, which means, when operated will hold said disc against rotation. This means comprises a stop member 130 slidable longitudinally in suitable guide means 131. The guide means is mounted upon the outer side of the lid 14 and covered by a curved cover plate 132. The stop member has a knurled head 133 projecting through the cover plate 132 to provide for operation thereof. Each of the stop members 130 extends through an opening 134 in the front wall 14 and is adapted to engage with the lugs 106 on one of the discs 17. Each stop member is provided with a lug 135 which is adapted, when the member is withdrawn or pulled outwardly, to engage on the outer edge of the guide means therefor, so as to hold said member in outwardly extending position, the guide means being slotted on one side to allow for the inward projection of said stop member. To project a stop member inwardly it is turned, so as to bring the lug 135 in line with the open side of the guide means, and is then pushed inwardly so that the inner ends thereof will engage with one of the lugs 106. It will thus be seen that it is possible to hold as many of the discs as desired against operation.

*Operation.*

In use, the device or machine is placed upon a stand or support and the operator by turning the handle 72 puts the machine into operation. When the handle 72 is turned the shaft 73 is rotated and thus rotates the pinions 74 and 77. Rotation of the pinion 74 transmits rotary movement to the gears 75 and 76, which gears are fixed respectively to the shafts 16 and 56. By reason of frictional engagement of the discs and drums on the respective shafts, with said shafts, the said discs and drums are rotated. Inasmuch as the degree of frictional engagement between these shafts the various drums and discs will vary, the degree of rotation of said discs and drums will likewise vary during the rotation of the shaft. The mechanism is so geared that the discs and drums will rotate several times before brought to rest with the indicia opposite the various slots and openings in the front wall. When the gear 76 rotates the shoe 83 is moved from position shown in full lines in Fig. 7 to position shown in dotted lines. This moves the arm 84 and causes the shaft 86 to be turned whereby the arm 88 moves forwardly into the position shown in dotted lines in Fig. 7. This causes the pins 93 to be projected forwardly and the arm 98 to be moved forwardly whereby the pins 104 will be projected into position to engage the lugs 106 on the discs and drums mounted on the upper shaft. It will thus be seen that the pins 93 are simultaneously moved to engage the lugs 94 and upon such engagement all of the drums on the shaft 56 will be brought to rest with certain indicia thereon opposite the slots 59. At substantially the same time the lugs 106 engage the pins 104 and the discs and drums on the upper shaft are brought to rest with certain indicia thereon registering with the various openings and slots for revealing such indicia. Immediately when the pins 104 and 93 move into position for engagement with the lugs 95 and 106, the gear 75, will have been rotated through one complete revolution and the lug 110 thereon engages the striker 109 so as to ring the bell. This is the signal for the operator to cease turning the crank handle. When the pins 104 and 93 are extended into position to engage the several lugs or the discs and drums, by reason of the fact that certain of the discs and drums will have stop lugs thereon spaced apart distances at variance with the spacing of the lugs on other discs, certain of these lugs will engage the stop pins before the lugs on other of the discs and drums move into such engagement. Thus, when the bell rings the several discs and drums have all been moved into position to aline the indicia of the several discs and drums with one another and the lugs of the several discs and drums are engaged with the stop pins whereby the indicia will be presented in even rows across the front of the machine. The bell therefore is a signal to indicate that the combination of indicia is formed for presentation at the openings and slots and the operation must be stopped. If the shaft is turned through the instrumentality of the crank handle, after the ringing of the bell or signal, the gears operating the device for moving the pins 93 will be operated so that the pins might be withdrawn, this, however, being dependent upon the amount of turning of the shaft after ringing of the bell. However, if the pins 93 are withdrawn, the combination indicia which has previously been alined for presentation will be destroyed and moved out of alinement. For this reason the bell is a signal to prevent rotation of the shaft past a point which projects the pins and to such extent that the pins will be moved out of stopping position. The bell signal makes it unnecessary for the operator to watch the presentation of the indicia at the time of operating the machine and in this way makes it unnecessary to assume stooping position or stand in front of the machine in order to view the indicia. During the rotation of the shafts 16 and 56, the roller 60 is rotated, by reason of the gears 77, 78 and 79. These gears are so arranged that when the discs and drums are brought to rest the roller will cease to rotate and bring the indicia thereon into registration with the slots 63. As the roller 60 rotates the gears 81 and 80 meshing with the gear 79 provide for the rotation of the rods 79'. Simultaneously with the rotation of the rods 79', said rods are moved at certain ends thereof so that said rods are oppositely inclined. This takes place as the shoe 116 moves laterally in the eccentric track 115 and the arm 117 oscillates, the gear 112 being driven through gears 113 and 114. As the arm 117 oscilates the rocker arms 121 and 122 are rocked so as to move the slide means 126 and 127 downwardly and upwardly respectively. This movement of the slide members to which slide members, the rods 79' are attached, causes said rods to be inclined in opposite directions. By reason of the inclination and rotation of said rods, the pointer members 70 and 71 will slide longitudinally and come to rest adjacent of certain of the designations 64, 65, 66, and 67. The slide members indicate the point to which the pupil must read the indicia, reading from left to right. Thus, if the pointer stop half way, the pupil would read from left to right up to the point at which the pointer stops.

Assuming that all of the stop members 139 are in out-of-the-way or withdrawn position, the discs 17 will each present a number opposite the openings in the front wall thereof. If desired, certain of the stop members may be pushed inwardly so as to cause certain of the discs to be held against rotation. The discs so held will present the characters 21 in registration with the openings 22, which characters may be pictures of animals or of fruit or the like as previously described. It will thus be seen that numbers in units of tens, hundreds etc., up to one million may be presented, as desired, by manipulating the stop members 130.

Summing up the presentation of data provided by one operation of the machine, it is seen that a variety of subjects of instruction will be presented in a unique and impressive manner. Reading from the left upper end of the machine, there will be a horizontal row, numbers or other characters, then the name of one of the Presidents of the United States, the season of the year, the day of the month, the day of the week, the time of day, (A. M.—P. M.), compass points, music notes, signs of the moon and a letter of the alphabet. Below this will appear the designations relating to weights and measures. Below this will appear the name of a famous personage and in a horizontal row across the machine in line with this will appear, the name of one of the principal islands, largest cities, rivers, and mountains. Below this will appear the linear and metric measure system and finally the names of the continents and countries of the world, with other data relating thereto, if desired. Upon each operation of the machine different indicia relating to the different subjects will be presented and owing to the manner in which the machine operates, it is impossible to tell just what indicia will appear. This element of uncertainty renders the operation and use of the machine much more impressive, provides for holding the interest of the pupils and prevents memorizing the indicia. In order to operate the machine, after one presentation of certain indicia, so as to present other combinations of indicia to view, after one combination has been read, the operator turns the crank handle and thereby rotates the shaft independent of the discs and drums until the gears operating the pins 93 are so moved as to withdraw the pins. This may be arranged so that only a part of one revolution of the shaft is required in order to withdraw the pins. As soon as the pins are withdrawn, the drums and discs are free to rotate through frictional engagement between their centers and the shaft and this operation of rotation takes place until the pins are again moved into stop position.

I claim:

1. An educational and amusement device embodying in its construction a casing, one wall of which is provided with an opening, a plurality of rotary members within the casing having indicia thereon arranged to be presented to view at said opening, a plurality of stop members on said rotary member, stop members within the casing adapted to be moved into and out of position to engage the first named stop members, means for rotating said rotary members, means operated automatically to move said last named stop members into engagement with the first named stop members after the predetermined rotation of said rotary members, whereby said rotary members are held against rotation and means operably associated with certain of said rotary members providing for holding said certain rotary members against rotation, independent of said first named stop means.

2. An educational and amusement device embodying in its construction a casing, having a plurality of spaced rows of openings in one wall thereof, a plurality of shafts rotatably mounted in the casing, a plurality of circular members mounted upon said shafts so as to have sufficient frictional engagement therewith to be rotated upon rotation of the shafts, said members having indicia on the peripheries thereof adapted to be presented to view at said openings when said members are held against rotation, means for rotating said shafts and means operating automatically when said members are rotated a predetermined extent for engaging and holding said members against rotation.

3. An educational and amusement device embodying in its construction a casing, having a plurality of spaced rows of openings in one wall thereof, a plurality of shafts rotatably mounted in the casing, a plurality of circular members mounted upon said shafts so as to have sufficient frictional engagement therewith to be rotated upon rotation of the shafts, said members having indicia on the peripheries thereof adapted to be presented to view at said openings when said members are held against rotation, means for rotating said shafts, means operating automatically when said members are rotated a predetermined extent for engaging and holding said members against rotation and means between said members frictionally engaging upon and adapted to rotate with said members, the shaft being such that said members will be relatively rotated upon rotation of the shaft.

4. An educational and amusement device embodying in its construction a casing, having a plurality of spaced rows of openings in one wall thereof, a plurality of shafts rotatably mounted in the casing, a plurality of circular members mounted upon said shafts so as to have sufficient frictional engagement therewith to be rotated upon rotation of the shafts, said members having indicia on the peripheries thereof adapted to be presented to view at said openings when said members are held against rotation, means for rotating said shafts, means operating automatically when said members are rotated a predetermined extent for engaging and holding said members against rotation, a rotary member disposed between said first named members and between said shafts and having indicia on its periphery arranged to be presented at certain of the openings and means for rotating said last named member operably associated with said first named rotating means.

5. An educational and amusement device embodying in its construction a casing having openings in one wall thereof, rotary shafts mounted within the casing, a plurality of circular members having indicia on the peripheries thereof, being loosely mounted upon the shaft and having frictional engagement with the shafts to be rotated relatively upon rotation of the shaft, means for rotating said shafts and means for automatically engaging and holding said members against rotation when the shafts have been rotated a predetermined extent.

6. An educational and amusement device embodying in its construction a casing having openings in one wall thereof, a rotary shaft mounted within the casing, a plurality of circular members having indicia on the peripheries thereof, being loosely mounted upon the shaft and having frictional engagement with the shaft to be rotated relatively upon rotation of the shaft, means for rotating said shaft and means for automatically engaging and holding said members against rotation when the shaft has been rotated a predetermined extent, which means comprises lugs mounted on said members, slide members mounted within the casing, pins on said slide members for moving the same to cause the pins to engage said lugs.

7. An educational and amusement device embodying in its construction a casing, having a plurality of spaced rows of openings in one wall thereof, a plurality of shafts rotatably mounted in the casing, a plurality of circular members mounted upon said shafts so as to have sufficient frictional engagement therewith to be rotated upon rotation of the shafts, said members having indicia on the peripheries thereof adapted to be presented to view at said openings when said members are held against rotation, means for rotating said shafts, means operating automatically when said members are rotated a predetermined extent for engaging and holding said members against rotation, said casing having its front wall provided with longitudinal slots, rods extending horizontally across the casing behind said slots, pointer means slidably mounted upon the rods and means operated by said rotating means for inclining said rods so as to cause the pointer members to slide thereon and be presented to view at said slots.

8. An educational and amusement device embodying in its construction a casing having openings in one wall thereof, a rotary shaft mounted within the casing, a plurality of circular members having indicia on the peripheries thereof, being loosely mounted upon the shaft and having frictional engagement with the shaft to be rotated relatively upon rotation of the shaft, means for rotating said shaft, means for automatically engaging and holding said members against rotation when the shaft has been rotated a predetermined extent and means operating automatically when the indicia on the peripheries of the circular members are alined transversely and ready for presentation through said openings, which will produce an audible signal to indicate to the operator that the operation must be stopped.

JOSEPH GALLEAZZI.